US008549116B2

(12) United States Patent
Vihtari et al.

(10) Patent No.: US 8,549,116 B2
(45) Date of Patent: *Oct. 1, 2013

(54) PCRF TRIGGERED RULES CLEANUP

(75) Inventors: Mike Vihtari, Kanata (CA); Ajay Kirit Pandya, Ottawa (CA)

(73) Assignee: Alcatel Lucent, Paris (FR)

( * ) Notice: Subject to any disclaimer, the term of this patent is extended or adjusted under 35 U.S.C. 154(b) by 768 days.

This patent is subject to a terminal disclaimer.

(21) Appl. No.: 12/774,440

(22) Filed: May 5, 2010

(65) Prior Publication Data

US 2011/0276667 A1 Nov. 10, 2011

(51) Int. Cl.
*G06F 15/177* (2006.01)
*G06F 17/00* (2006.01)

(52) U.S. Cl.
USPC ............................................ 709/221; 706/47

(58) Field of Classification Search
None
See application file for complete search history.

(56) References Cited

U.S. PATENT DOCUMENTS

| | | | |
|---|---|---|---|
| 8,175,576 B2 * | 5/2012 | Przybysz et al. | 455/406 |
| 8,238,873 B2 * | 8/2012 | Wu | 455/406 |
| 8,244,263 B2 * | 8/2012 | Cuervo et al. | 455/450 |
| 8,295,170 B2 * | 10/2012 | Cuervo | 370/230 |
| 8,305,922 B2 * | 11/2012 | Cuervo | 370/252 |
| 2007/0123213 A1 * | 5/2007 | Wu | 455/406 |
| 2009/0215454 A1 * | 8/2009 | Przybysz et al. | 455/435.1 |
| 2011/0022722 A1 * | 1/2011 | Castellanos Zamora et al. | 709/235 |
| 2011/0201303 A1 * | 8/2011 | Cutler et al. | 455/406 |
| 2011/0202491 A1 * | 8/2011 | Pandya et al. | 706/47 |

* cited by examiner

*Primary Examiner* — Mohamed Ibrahim
*Assistant Examiner* — Thomas Richardson
(74) *Attorney, Agent, or Firm* — Kramer & Amado P.C.

(57) ABSTRACT

Various embodiments relate to a system and related method of handling a plurality of user messages originating from a user device in a communications network. Various embodiments relate to a Policy Charging and Rules Node (PCRN) receiving an initial message from a first device, while anticipating a complementary message from a second device. Upon receipt of the complementary message, the PCRN may pair the messages and generate a rule from the paired message. If the PCRN does not receive the complementary message, the PCRN may generate the rule from only the initially-received message or may ignore the message. The PCRN may treat each received message independent from each other so that lack of receipt of a complementary message does not affect the creation of rules from another paired message.

22 Claims, 3 Drawing Sheets

PCRF TRIGGERED RULES CLEANUP

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed solely for voice communications has recently grown into a heterogeneous system that enables access to communications platforms such as text messaging, multimedia streaming along with general Internet access. To support such applications, service and infrastructure providers have built new networks over existing voice communication infrastructure. As evidenced by second and third generation networks, voice services must be carried over dedicated voice channels toward a traditional circuit-switched core, while other services, such as IP-enabled data and communications may be transmitted over a different packet-switched core, following Internet protocol (IP). This has led to unique problems, including, for example, application provision, metering and charging, and quality of experience (QoE) assurance.

One recent attempt to enhance the dual-core approach of the second (2G, 2.5G) and third generations (3G) of mobile telecommunications standards defined by the International Telecommunications Union has been in the form of a new set of standards. The Third Generation Partnership Project (3GPP) has recommended a new network scheme deemed 'Long Term Evolution' (LTE). Under the new standards, all communications in an LTE network are carried over an IP channel from user equipment (UE), such as a mobile phone or smartphone, to an all-IP core named the Evolved Packet Core (EPC). The EPC may then provide gateway access to other networks, while also ensuring an acceptable QoE for a user's network activity and properly charging the subscriber for such activity.

The 3GPP generally describes the components of the EPC and their interactions with each other in some technical specifications, specifically, 3GPP TS 29.212, 3GPP TS 29.213, and 3GPP TS 29.214, which describe components such as a Policy and Charging Rules Function (PCRF), Policy and Charging Enforcement Function (PCEF), and Bearer Binding and Event Reporting Function (BBERF) of the EPC. These technical specifications also provided some details regarding the interactions between these components. These specifications gave some guidance on how the EPC could provide reliable data services to users, while also reliably charging subscribers for use of the IP network.

For example, 3GPP TS 29.212, 3GPP TS 29.213, and 3GPP TS 29.214 provide some guidance on rule generation by the PCRF when receiving messages from at least two different sources, such as, for example, the application function (AF) and the PCEF. These specifications provide some guidance, for example, for when the PCRN receives the first of a two-part message. However, the algorithm outlined by the specifications may not always work efficiently under certain circumstances.

In view of the foregoing, it would be desirable to provide a system and method more capable of handling complementary messages. In particular, it would be desirable to provide a system that may handle complementary messages for a range of circumstances.

SUMMARY

In light of the present need for a method for handling the anticipated receipt of paired messages, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a method performed by a Policy Charging and Rules Node (PCRN) to handle a plurality of requests from a user device for service in a communications network. The method may include the PCRN receiving, from a first gateway, a plurality of initial requests to establish a plurality of services for the user device. The PCRN may then create a rule for each of the received initial requests in said plurality of initial requests and wait for a defined period to receive at least one complementary request from a second gateway, wherein each complementary request matches one of the received initial requests in the plurality of initial requests. The PCRN may then receive from the second gateway at least one complementary request, form at least one paired request after the defined period by matching each of the at least one received complementary request with one of the plurality of received initial requests, and remove each rule corresponding to each received request that is not part of the at least one paired request.

Various embodiments may also relate to a system for handling a plurality of requests from a user device for service in a communications network. The system may include the user device that requests a plurality of services. The system may also include a first gateway that transmits a plurality of initial requests to establish the plurality of services for the user device and a second gateway that transmits at least one complementary request to establish at least one service from the plurality of services for the user device, wherein the at least one complementary request matches at least one initial request from the plurality of requests. The system may also include a Policy and Charging Rules Node (PORN) that receives the plurality of initial requests and the at least one complementary request. The PORN in the system may create a rule for each of the plurality of initial requests received, wait for a defined period to receive the complementary requests, form at least one paired request after the defined period by matching each of the at least one complementary request with one of the plurality of received initial requests, and remove each rule corresponding to each received request that is not part of the at least one paired request.

It should be apparent that, in this manner, various exemplary embodiments enable dynamic handling of complementary messages from multiple sources. Particularly, by enabling the PCRN to control the handling of complementary messages, the PCRN may more efficiently process requests from a user device.

BRIEF DESCRIPTION OF THE DRAWINGS

In order to better understand various exemplary embodiments, reference is made to the accompanying drawings wherein.

DETAILED DESCRIPTION

Figure 1:
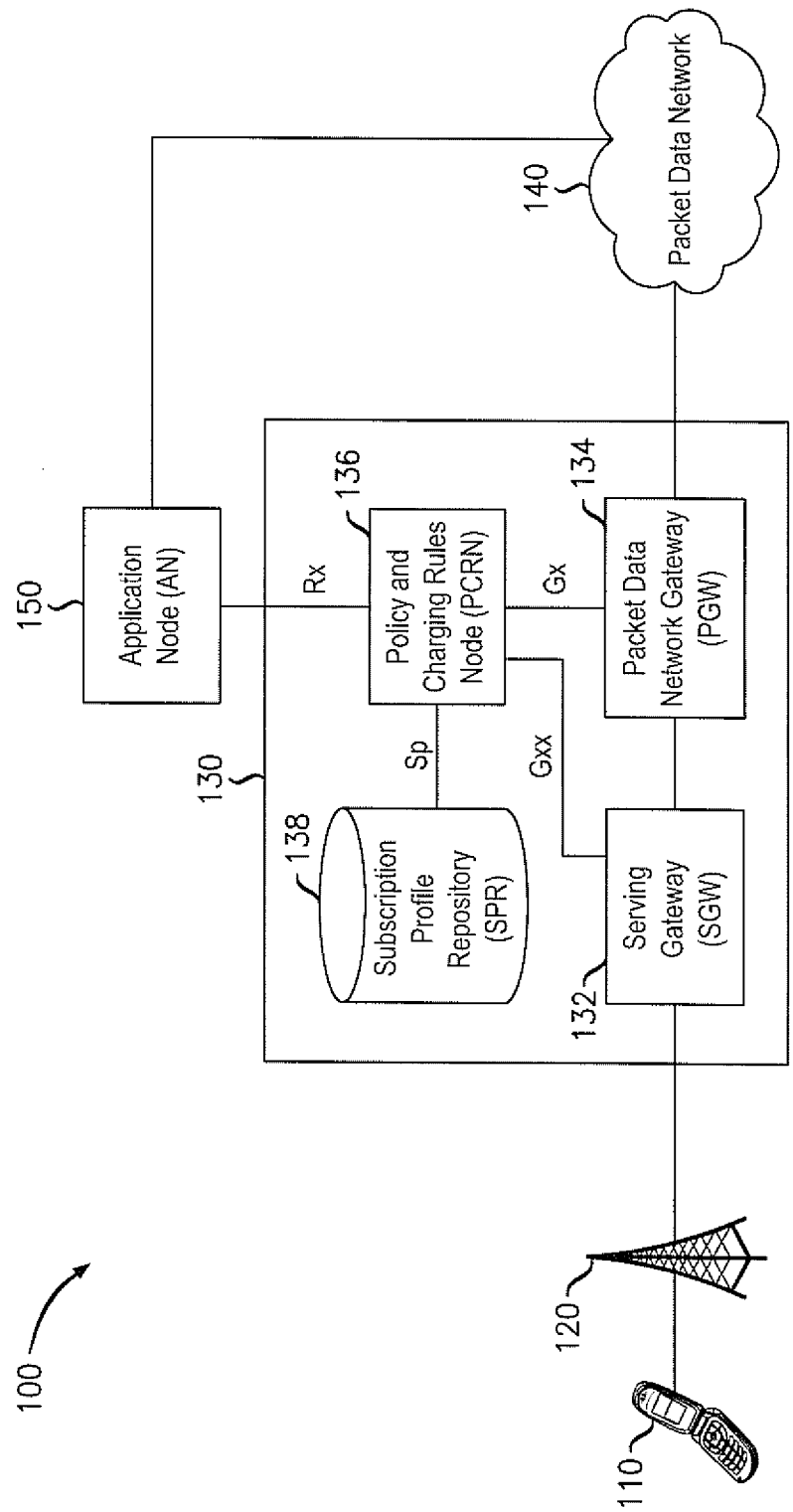
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. Exemplary subscriber network 100 may include at least one piece of user equipment (UE) 110, a base station 120, an evolved packet core (EPC) 130, a packet data network 140, and an application node (AN) 150.

User equipment (UE) 110 may be a device that communicates with the packet data network 140 for providing the end-user with a data service. Such data service may include, for example, voice communication, text messaging, multimedia streaming, and Internet access. Specifically, in various exemplary embodiments, UE 110 is a personal or laptop computer, wireless e-mail device, cellular phone, television set-top box, or any other device capable of communicating with other devices via the EPC 130.

Base station 120 may be a device that enables communication between UE 110 and the EPC 130. For example, the base station 120 may be a base transceiver station such as an evolved nodeB (eNodeB) as defined by 3GPP standards. Thus, the base station 120 may be a device that communicates with the UE 110 via a first medium, such as radio communication, and communicates with the EPC 130 via a second medium, such as an Ethernet cable. Base station 120 may be in direct communication with the EPC 130 or may communicate via a number of intermediate nodes (not shown in FIG. 1). In various embodiments, multiple base stations (not shown) similar to the base station 120 may be present to provide mobility to the UE 110. In various alternative embodiments, UE 110 may communicate directly with the EPC 130. In such embodiments, the base station 120 may not be present.

Evolved packet core (EPC) 130 may be a device or network of devices that provides the UE 110 with gateway access to the packet data network 140. EPC 130 may further charge a subscriber for use of provided data services and ensure that particular quality of experience (QoE) standards are met. Thus, the EPC 130 may be implemented, at least in part, according to the 3GPP TS 29.212, 29.213, 29.214 technical specifications. Accordingly, the EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by the UE 110. SGW 132 may forward such packets towards the PGW 134. SGW 132 may perform a number of functions such as, for example, managing mobility of user equipment 110 between multiple base stations (not shown) and enforcing particular quality of service (QoS) characteristics, such as guaranteed bit rate, for each flow being served. In various implementations, such as those implementing the Proxy Mobile Internet Protocol (PMIP) standard, the SGW 132 may include a Bearer Binding and Event Reporting Function (BBERF). In various exemplary embodiments, the EPC 140 may include multiple SGWs (not shown) similar to the SGW 132 and each SGW may communicate with multiple base stations (not shown) similar to the base station 120.

Packet data network gateway (PGW) 134 may be a device that provides gateway access to the packet data network 140. PGW 134 may be the final device within the EPC 130 that receives packets sent by user equipment 110 toward the packet data network 140 via the SGW 132. PGW 134 may include a policy and charging enforcement function (PCEF) that enforces policy and charging control (PCC) rules for each service data flow (SDF). Thus, the PGW 134 may be a policy and charging enforcement node (PCEN). PGW 134 may include a number of additional features, such as, for example, packet filtering, deep packet inspection, and subscriber charging support.

Policy and charging rules node (PCRN) 136 may be a device that receives requests for services, generates PCC rules, and provides PCC rules to the PGW 134 and/or other PCENs (not shown). PCRN 136 may be in communication with AN 150 via an Rx interface. PCRN 136 may receive requests from AN 150, SGW 132, or PGW 134. Upon receipt of a service request, PCRN 136 may generate at least one new PCC rule for fulfilling the service request.

PCRN 136 may also be in communication with SGW 132 and PGW 134 via a Gxx and a Gx interface, respectively. Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

PCRN 136 may receive related requests from a plurality of sources and may generate a PCC rule for fulfilling the service request related to the related requests. For example, a UE 110 may transmit a request for service. PCRN 136 may receive a first request from the AN 150 and a second, related request for service from the PGW 134. PCRN 136 may pair the related requests together and generate a rule, e.g., a PCC rule, and send the generated rule to both the AN 150 and the PGW 134

Subscription profile repository (SPR) 138 may be a device that stores information related to subscribers to the subscriber network 100. Thus, SPR 138 may include a machine-readable storage medium such as a read-only memory (ROM), a random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AN 150. Packet data network 140 may further provide, for example, phone and/or Internet service to various user devices in communication with packet data network 140.

Application node (AN) 150 may be a device that includes an application function (AF) and provides an application service to user equipment 110. Thus, AN 150 may be a server or other device that provides, for example, a video streaming or a voice communication service to user equipment 110. AN 150 may further be in communication with the PCRN 136 of the EPC 130 via an Rx interface. When AN 150 is to begin providing application service to user equipment 110, AN 150 may generate a request message, such as an AA-Request (AAR) according to the Diameter protocol, to notify the PCRN 136. This request message may include information such as an identification of the subscriber using the application service and an identification of the particular service data flows that must be established in order to provide the requested service. AN 150 may communicate such an application request to the PCRN 136 via the Rx interface.

Figure 2:
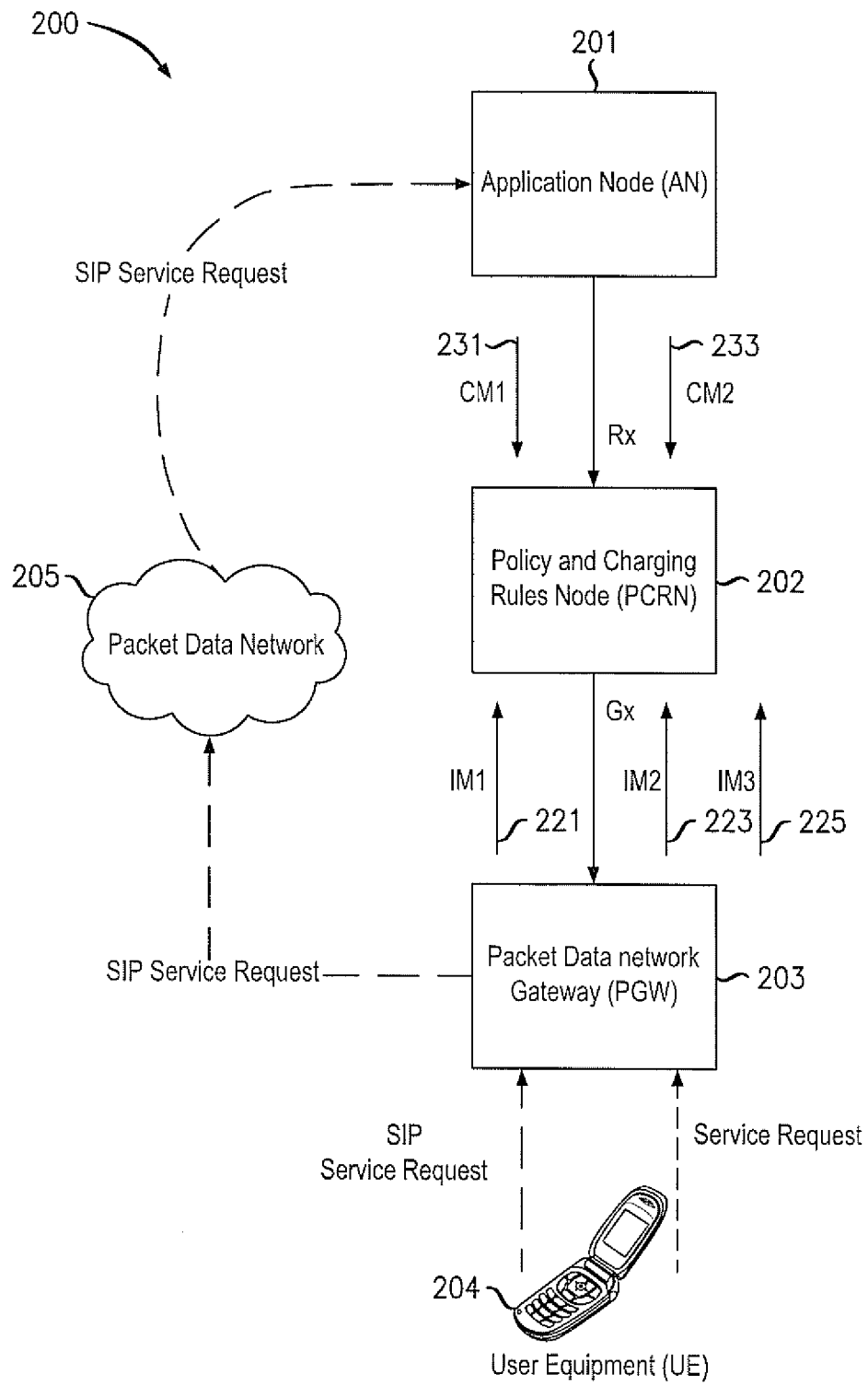
FIG. 2 illustrates an exemplary network for a policy charging and rules node (PCRN) receiving complementary service requests.

FIG. 2 illustrates an exemplary communications network, with a PCRN receiving multiple messages for a service request. System 200 is similar to system 100, with application node (AN) 201, policy and charging rules node (PCRN) 202, packet data network gateway (PGW) 203, user equipment 204, and packet data network 205 corresponding to AN 150, PCRN 136, PGW 134, UE 110, and packet data network 140, respectively.

In system 200, UE 204 may send multiple related service requests through multiple devices, such as AN 201 and PGW 203, with the request eventually being sent to PCRN 202. PCRN 202 may then take the received service requests and form a plurality of services, using with the received information and other available information stored at the PCRN 202. PCRN 202 may then implement the service and may also form associated rules, forwarding the created rules to PGW 203, which may then transmit the rules to other gateways, such as SGW 132.

UE 204 may, for example, send a session initiation protocol (SIP) service request that may be handled by application node (AN) 201. AN 201 may receive the service request through packet data network 205 and PGW 203. AN 201 may package the received service request into a message (MSG1) that may then be sent to the PCRN 202 via the Rx interface. The message sent by AN 201 may include information regarding connection details, such as the required bandwidth and type of media (e.g., voice, video, data, etc.) required. In some embodiments, the message sent by the AN 201 to the PCRN 202 may take precedent over messages the PCRN 202 receives from other components, so that when PCRN 202 receives conflicting messages from other components (e.g., PGW 203), the PCRN 202 uses the information included in the message received from AN 201.

The message sent by the AN 201 may be in the form of an AA-Request command. The AA-Request command may include a plurality of information, including the IP address of the UE 204 (for example, in a Forward-IP-Address attribute-value pair (AVP) or Framed-IPv6-Prefix AVP) and other service information (e.g., in a Media-Component-Description AVP). The AA-Request may also include information indicating the particular service to which a session may belong (for example, in an AF-Application-Identifier AVP).

UE 204 may also send another service request related to the SIP service request previously through the AN 201. The related service request (e.g., complementary request) may be paired with the initial service request sent through the AN 201. The complementary service request may be sent through the PGW 203 to the PCRN 202, where the PGW 203 sends the complementary service request in the form of a CC Request message. PGW 203 may therefore send a message in that includes a CC Request. The CC Request may include an Event-Trigger AVP and a Packet-Filter-Operation AVP, which may trigger certain actions by the PCRN 202, which will be discussed below in relation to FIG. 3. The CC Request may also include a corresponding Packet-Filter-Information AVP.

PGW 203 may include a policy charging and enforcement function (PCEF), which may include the complementary service request in a message (MSG2) that is sent to the PCRN 202. The message sent from the PGW 203 may be the mate message to the message (MSG1) sent from the AN 201, as the PCRN 202 may use information from both received messages (e.g., paired message) when creating a PCC rule. The information included in the message sent from PGW 203 may include other communication requirements, such as the required guaranteed bit rate. The information included in the message sent through the PGW 203 may be related to the requirements for the UE 204 to connect to the packet data network.

The PCRN 202 may receive one or messages containing information and may use the information to form at least one PCC rule. PCRN 202 may use different procedures to produce a rule based on the initial message it receives. For example, if the PGW 203 containing the PCEF solicits a request for the provisioning of the PCC rule, the PCRN 202 may implement a PUSH procedure, as will be discussed further in relation to FIG. 3, wherein the PCRN 202 provisions the PCC rule in a Re-authorization Request (RAR) command to the PGW 203. Alternatively, when the request is unsolicited (e.g., the first request comes from AN 201), the PCRN 202 may implement a PULL command, wherein PCRN 202 creates a PCC rule and includes the PCC rule in a CCA message.

The UE 204 may send one or more service requests simultaneously to the PCRN 202. In some embodiments, the plurality of service requests may be for related services. In other embodiments, the UE 204 may request one or more unrelated services from the PCRN 202. In some embodiments, the PCRN 202 may handle the plurality of service requests as completely unrelated and may handle the requests independent of each other. In other embodiments, the PCRN 202 may handle the plurality of service requests as related and may either enable or deny service based on the handling of each request in the plurality.

Having described the components of subscriber network 100, 200 a brief summary of the operation of subscriber network 100, 200 will be provided. It should be apparent that the following description is intended to provide an overview of the operation of subscriber network 100, 200 and is therefore a simplification in some respects. The detailed operation of subscriber network 100, 200 will be described in further detail below in connection with FIG. 3.

According to various exemplary embodiments, user equipment (UE) 204 may communicate with a plurality of devices, including the AN 201, SGW 132, or PGW 203 to indicate that user equipment 204 wishes to receive service. Such communication may occur via EPC 130 and packet data network 205 or via other communications channels (not shown). AN 201, SGW 132, or PGW 203 may then construct a message, including some of the necessary subscriber and data flow information necessary to provide the requested service. All of the necessary information may be scattered across multiple devices, such as the AN 201, SGW 132, SPR 138, and the PGW 203. AN 201, SGW 132, SPR 138 or PGW 203 may then forward the generated message to the PCRN 202 through the requisite interface.

Upon receipt of a first plurality of initial messages 221-225, the PCRN 202 may wait for an equal quantity of complementary messages. In some embodiments, the PCRN 202 may wait for a defined period by starting a timer upon receipt of the first plurality of messages. In some embodiments, the PCRN's 202 initiation of the timer may move the creation of the rule to the end of an execution queue for the PCRN 202.

For example, PGW 203 may send a first plurality of initial messages 221-225 to the PCRN 202, which may then anticipate receiving a second plurality of complementary messages 231-233 for each of the received initial messages 221-225. The PCRN 202 may then place the generation of the PCC rule to the end of its execution queue, effectively waiting for the second plurality of complementary messages to arrive while executing other functions. When the PCRN 202 receives the second plurality of complementary messages 231-233 before the timer expires and the quantity of complementary messages is equal to the quantity of received initial messages, the PCRN 202 may immediately generate a quantity of rules equal to the plurality of initial messages 221-225. PCRN 202 may use information from each set of paired messages (i.e., an initial message 221 and a complementary message 231) to create each rule.

However, when the second plurality of complementary messages 231-233 does not completely arrive before the timer expires, the PCRN 202 may then generate a quantity of rules from the plurality of complete paired messages, i.e., initial messages 221-223 and complementary messages 231-233. In some embodiments, the PCRN 202 may take no further actions for those received initial rules 225 for which the PCRN 202 did not also receive a complementary message. In some embodiments, the PCRN 202 may attempt to generate a rule using available information from at least the received initial message 225. The PCRN 202 may also attempt to include information from existing rules. PCRN 202 may also take subscriber data from SPR 138 and internally-generated policy decisions into account when determining whether to attempt generating a rule from only the initial message 225.

PCRN 202 may then transmit the generated PCC rule to PGW 203 via the Gx interface for installation. In some embodiments, the PCRN 202 may receive the missing complementary message (not shown) after the defined period. PCRN 202 may thereafter generate a new rule using both the initial message 225 and complementary message. The new rule may replace the previously-crafted rule that only used information from the initial message 225. After installation of either the first or second rule, the PCRN 202, through devices such as SGW 132 and PGW 203, may therefore allow communication for the requested service, while also enabling further functionality by, for example, enabling the appropriate charging of the subscriber and ensuring that a particular QoS is met.

Figure 3:
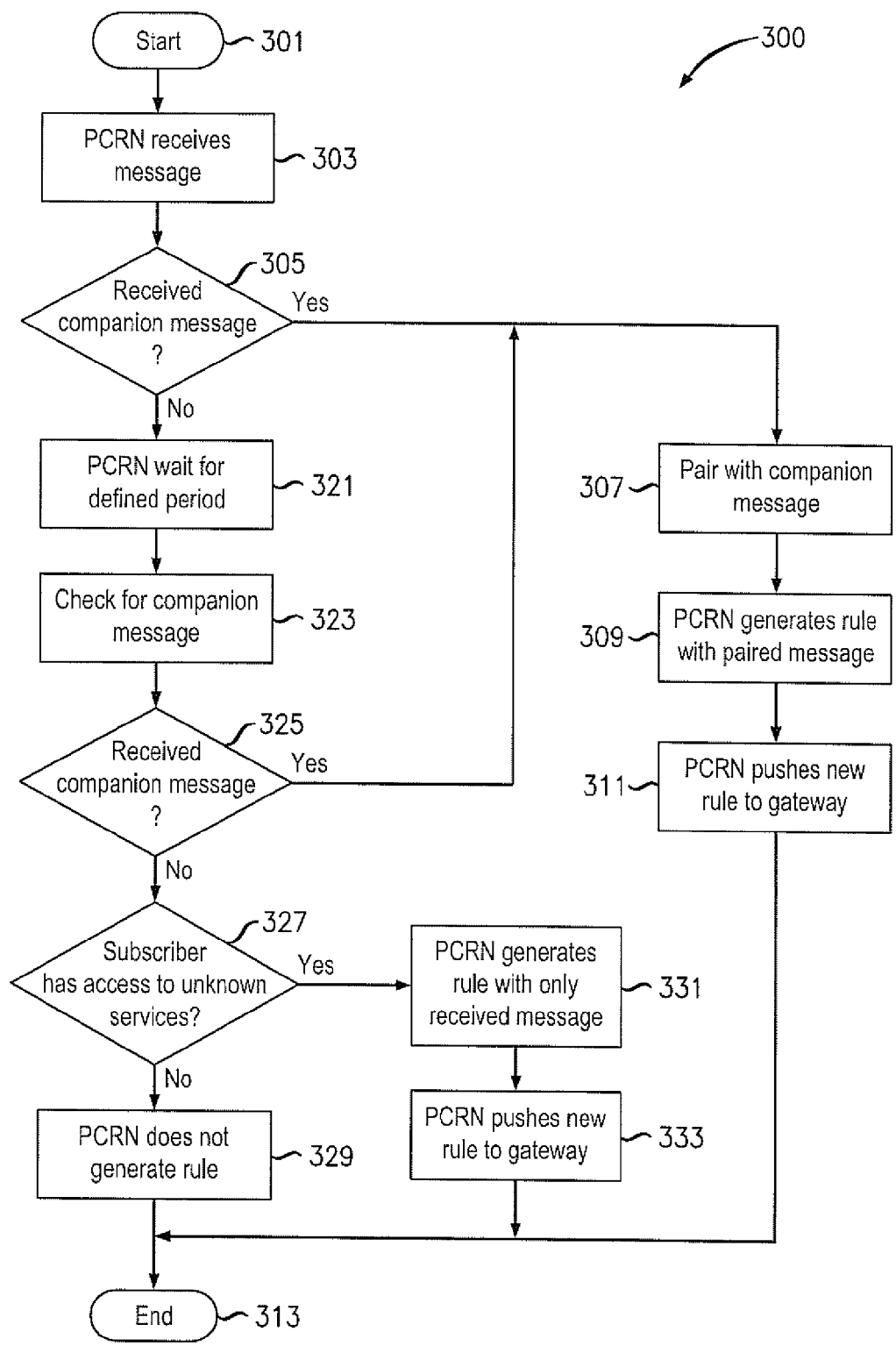
FIG. 3 illustrates an exemplary flowchart for generating a rule when receiving a message from an application node.

FIG. 3 illustrates an exemplary flowchart for creating a new rule in response to a service request from the UE 204. PCRN 202 may implement method 300 when it receives, for example, a service request from the UE 204 through the AN 201 and/or PGW 203.

Method 300 may begin at step 301 and proceed to step 303, where the PCRN 202 may receive a message from the UE 204. In some embodiments, the PCRN 202 may receive a service request from AN 201 in the form of a service flow via the Rx interface. Because the PCRN 202 receives a message from the AN 201 first, the corresponding PCC rule may be labeled as "Network-Initiated." The service flow may be derived from a hierarchy of components in an AN message. An AN message may consist of a plurality of Media Components (MC), with each Media Component containing a plurality of Media Sub-Components (MSC). Each Media Sub-Component may contain either one or two flow descriptions (FD). The service flow may be a flattened representation of this hierarchy, matching the one or two flow descriptions with the corresponding MCs and MSCs. Each service flow may map to a distinct rule that may be installed in the gateways SGW 132 or PGW 134. Accordingly, the rule may contain a reference to the service flow used in its creation.

In another embodiment, the PCRN 202 may first receive a service request from PGW 134 that includes flow information. The flow information may be contained within a Packet-Filter-Information AVP included in the service request. The service request may also include a corresponding Packet-Filter-Operation AVP. In this instance, because the PGW 134 initiated the service request, the corresponding rule may be labeled as "UE-Initiated." In some embodiments, the CC Request that comprised the service request may include a Packet-Filter-Information AVP for each packet filter requested by the UE 204 and a QoS-Information AVP that may indicate the requested quality of service for the packet filter.

Method 300 may then proceed to step 305, where the PCRN 202 may determine whether it is storing a message that is a companion to the received message. In some embodiments, this may be an initially-received message or a created rule that matches the received service flow. In other embodiments, the companion message may be an initially-received service flow that matches the received flow information.

If there is a companion rule stored in the PCRN 202, method 300 may proceed to step 307, where the PCRN 202 may pair the received message with the stored companion message. PCRN 202 may create a paired message when combining the initially-received, stored companion message with the message received. In step 309, the PCRN 202 may create a rule using information contained in the paired message. The information contained in the paired message may include all the information contained in both the initially received, the stored message, and the subsequently received message. In step 311, the PCRN 202 may forward the new rule to the PCEF in PGW 134, which may in turn push the new rule to other gateways. PCRN 202 may then end method 300 at step 313.

If there is no companion message, this may indicate that the received message initiated the request for a rule, so the method proceeds to step 321, where the PCRN 202 may wait for a defined period. PCRN 202 may start a timer to wait to receive the mate message. PCRN 202 may wait for the mate message because the mate message may contain information complementary to the initially-received message. For example, if the PCRN 202 initially received a message from AN 201 in step 303, in step 321, the PCRN 202 may wait for a defined period to receive a complementary message from PGW 134.

PCRN 202 may wait until either the timer expires or the complementary message arrives. In either case, method 300 proceeds to step 323-325, where the PCRN 202 determines if it received a message during the waiting period and if the newly-received message is complementary to the initially-received message. If the PCRN 202 did receive a complementary message, method 300 may then proceed to steps 307-311, where the PCRN 202 binds the two messages into a paired message, creates a rule from the paired message, and pushes the newly-created rule to the gateways.

PCRN 202 may then proceed to step 327, where it may determine whether the subscriber of the UE 204 has access to unknown services. In some embodiments, the PCRN 202 may determine whether the subscriber has access to unknown services through contact with the SPR 138. If the subscriber does not have access to unknown services, method 300 may then proceed to step 329. In this instance, the PCRN 202 may modify not generate a rule with the available information, which may only include the initially-received message. PCRN 202 may then end method 300 at step 313.

Returning now to step 327, if the PCRN 202 determines that the subscriber has access to unknown services, the PCRN 202 may generate rule using the information included in the PCRN 202. In some embodiments, the PCRN 202 may generate a rule with only the information included in the initially-received message. In other embodiments, the PCRN 202 may use information from other stored services, such as information included in an associated unknown application. In some embodiments, the subscriber access to unknown services may be specific to the service. For example, the SPR 138 may hold records that state a subscriber has access to unknown voice services, but does not have access to unknown data services. After generating a new rule using available information, the PCRN 202 may proceed to step 333, where it pushes the newly-generated rule to the PCEF in PGW 134, which may then push the new rule to the other gateways. PCRN 202 may then end method 300 in step 313.

During regular operation, the PCRN 202 may enact method 300 for each message received. In some embodiments, the PCRN 202 may therefore independently create rules for paired messages, while ignoring expected paired messages when the PCRN 202 receives only a portion of the pair. For example, if the PCRN 202 receives initial messages 221-225, the PCRN 202 may wait to receive complementary messages 231-235. When complementary messages 231-233 arrive, the PCRN 202 may enact method 300 for each received message to pair the subsequently-received messages 231-233 with initially-received messages 221-223. As the PCRN 202 did not receive complementary message 235 (not shown), the PCRN 202 may not generate a rule for that message if the subscriber does not have access to unknown services.

Therefore, the PCRN 202 may handle the creation of rules independently, instead of, for example, dropping an entire bundle of messages if it did not receive complementary messages for each member of the bundle. This may save time and bandwidth, for example, as the PCRN 202 may only require the UE 204 to resend the missing pair of messages instead of the entire bundle. In some embodiments, the PCRN 202 may also save time and bandwidth by enabling the creation of a rule when a subscriber has access to unknown services and the PCRN 202 only receives a portion of an expected paired message.

According to the foregoing, various exemplary embodiments provide for dynamic creation of rules in response to the expected receipt of paired messages from multiple devices. Particularly, by independently generating rules upon receipt of initial and complementary messages and ignoring partially-received paired messages, the PCRN may enable proper functioning of the communications system, while also boosting efficiency and minimizing bandwidth.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or another computing device. Thus, a machine-readable storage medium may include a read-only memory (ROM), a random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A method performed by a Policy Charging and Rules Node (PCRN) to handle a plurality of requests from a user device for service in a communications network, the method comprising:
   receiving, from a first gateway, a plurality of initial requests to establish a plurality of services for the user device;
   creating a rule for each of the received initial requests in said plurality of initial requests;
   waiting for a defined period to receive at least one complementary request from a second gateway, wherein each complementary request matches one of the received initial requests in the plurality of initial requests;
   receiving, from the second gateway, at least one complementary request;
   forming at least one paired request after the defined period by matching each of the at least one received complementary request with one of the plurality of received initial requests; and
   removing each rule corresponding to each received request that is not part of the at least one paired request.

2. The method of claim 1, wherein the plurality of received initial requests is greater in quantity than the plurality of complementary requests.

3. The method of claim 1, further comprising:
   signaling, upon the creation of the plurality of rules for each of the received initial requests, the first gateway to establish services for each of the plurality of received initial requests.

4. The method of claim 3, further comprising:
   removing each service established in the first gateway corresponding to each received request that is not part of the at least one paired request.

5. The method of claim 1, further comprising:
   signaling the first and second gateways to establish services for the at least one paired request.

6. The method of claim 1, wherein the first and second gateways sending user requests comprise a device from a list of: a serving gateway, a Packet Data Network Gateway (PGW), and an Application Node (AN).

7. The method of claim 1, further comprising:
   determining whether a subscriber for the user device only has access to known services;
   abstaining from removing each rule corresponding to each received request that is not part of the at least one paired request when the subscriber has access to unknown services; and removing each rule corresponding to each received request that is not part of the at least one paired request when the subscriber only has access to known services.

8. The method of claim 7, wherein the first gateway:
receives a plurality of user requests from the user device;
generates the plurality of initial requests corresponding to the plurality of user requests, wherein the at least two initial requests comprise messages containing a session establishment request and identification information; and
transmits the at least two initial requests to the PCRN.

9. The method of claim 8, wherein the identification information comprises a Session Binding Identifier (SBI) comprising a set of attributes, the attributes including at least one of:
a session identification;
an IPv4 address; an IPv6 address;
an Access Point Name (APN); and
at least one subscriber identifier (SID);
wherein the attributes comprising the SBI also comprise attributes in at least one subscriber profile corresponding to the subscriber.

10. The method of claim 7, wherein the second gateway:
receives a plurality of user requests from the user device;
generates the plurality of initial requests corresponding to the plurality of user requests, wherein the at least two initial requests comprise messages containing a session establishment request and identification information; and
transmits the at least two initial requests to the PCRN.

11. The method of claim 8, wherein the identification comprises a Session Binding Identifier (SBI) comprising a set of attributes, the attributes including at least one of:
a session identification;
an IPv4 address; an IPv6 address;
an Access Point Name (APN); and
at least one subscriber identifier (SID);
wherein the attributes comprising the SBI also comprise attributes in at least one subscriber profile corresponding to the subscriber.

12. A system for handling a plurality of requests from a user device for service in a communications network, the system comprising:
a first gateway that, in response to a request for plurality of services by the user device, transmits a plurality of initial requests to establish the plurality of services for the user device;
a second gateway that transmits at least one complementary request to establish at least one service from the plurality of services for the user device, wherein the at least one complementary request matches at least one initial request from the plurality of requests; and
a Policy and Charging Rules Node (PCRN) that receives the plurality of initial requests and the at least one complementary request, wherein the PCRN:
creates a rule for each of the plurality of initial requests received,
waits for a defined period to receive the complementary requests,
forms at least one paired request after the defined period by matching each of the at least one complementary request with one of the plurality of received initial requests; and
removes each rule corresponding to each received request that is not part of the at least one paired request.

13. The system of claim 12, wherein the plurality of received initial requests is greater in quantity than the plurality of complementary requests.

14. The system of claim 12, wherein the PCRN signals, upon the creation of the plurality of rules for each of the received initial requests, the first gateway to establish services for each of the plurality of received initial requests.

15. The system of claim 14, wherein the first gateway removes each service established corresponding to each received request that is not part of the at least one paired request.

16. The system of claim 12, wherein the PCRN signals the first and second gateways to establish services the at least one paired request.

17. The system of claim 12, wherein the first and second gateways sending user requests comprise a device from a list of: a serving gateway, a Packet Data Network Gateway (PGW), and an Application Node (AN).

18. The system of claim 12, wherein the PCRN further:
determines whether a subscriber for the user device only has access to known services; and
removes each rule corresponding to each received request that is not part of the at least one paired request when the subscriber only has access to known services.

19. The system of claim 18, wherein the first gateway further:
receives a plurality of user requests from the user device;
generates the plurality of initial requests corresponding to the plurality of user requests, wherein the at least two initial requests comprise messages containing a session establishment request and identification information; and
transmits the at least two initial requests to the PCRN.

20. The system of claim 19, wherein the identification information comprises a Session Binding Identifier (SBI) comprising a set of attributes, the attributes including at least one of:
a session identification;
an IPv4 address; an IPv6 address;
an Access Point Name (APN); and
at least one subscriber identifier (SID);
wherein the attributes comprising the SBI also comprise attributes in at least one subscriber profile corresponding to the subscriber.

21. The system of claim 18, wherein the second gateway further:
receives a plurality of user requests from the user device;
generates the plurality of initial requests corresponding to the plurality of user requests, wherein the at least two initial requests comprise messages containing a session establishment request and identification information; and
transmits the at least two initial requests to the PCRN.

22. The system of claim 21, wherein the identification information comprises a Session Binding Identifier (SBI) comprising a set of attributes, the attributes including at least one of:
a session identification;
an IPv4 address; an IPv6 address;
an Access Point Name (APN); and
at least one subscriber identifier (SID);
wherein the attributes comprising the SBI also comprise attributes in at least one subscriber profile corresponding to the subscriber.

* * * * *